(12) United States Patent
Hehenberger

(10) Patent No.: US 9,067,340 B2
(45) Date of Patent: Jun. 30, 2015

(54) APPARATUS FOR GRANULATING PLASTIC

(76) Inventor: Gerhard Hehenberger, Eggendorf (AT)

( * ) Notice: Subject to any disclaimer, the term of this patent is extended or adjusted under 35 U.S.C. 154(b) by 389 days.

(21) Appl. No.: 13/068,719

(22) Filed: May 18, 2011

(65) Prior Publication Data

US 2011/0309172 A1 Dec. 22, 2011

(30) Foreign Application Priority Data

Jun. 22, 2010 (AT) .................. A 1029/2010

(51) Int. Cl.
*B29C 47/30* (2006.01)
*B29B 9/06* (2006.01)
*B29C 47/00* (2006.01)
*B29C 47/20* (2006.01)
*B29K 105/00* (2006.01)

(52) U.S. Cl.
CPC ............... *B29B 9/06* (2013.01); *B29C 47/0014* (2013.01); *B29B 9/065* (2013.01); *B29C 47/20* (2013.01); *B29C 47/0011* (2013.01); *B29C 47/30* (2013.01); *B29K 2105/251* (2013.01)

(58) Field of Classification Search
CPC .......... B29B 9/06; B29B 9/065; B29C 47/30; B29C 47/0014; B29C 47/12; B29C 47/20; B29C 45/17; B29C 47/0011; B29K 2105/251
USPC ............. 425/382 R, 462, 463, 464, 465, 467, 425/382.2, 382 N, 190, 192 R
See application file for complete search history.

(56) References Cited

U.S. PATENT DOCUMENTS

| 3,436,449 | A | | 4/1969 | Treu et al. |
| 3,516,120 | A | * | 6/1970 | Siegfried et al. ................. 425/67 |
| 3,792,950 | A | | 2/1974 | Cuff |
| 4,120,625 | A | * | 10/1978 | Heckeroth ........................ 425/71 |
| 4,378,964 | A | * | 4/1983 | Wolfe, Jr. ...................... 425/463 |
| 4,678,423 | A | * | 7/1987 | Bertolotti ....................... 425/311 |
| 5,593,702 | A | | 1/1997 | Harris et al. |
| 5,916,440 | A | | 6/1999 | Garcera et al. |
| 6,595,765 | B1 | * | 7/2003 | Lengerich et al. ......... 425/131.1 |
| 6,659,757 | B2 | | 12/2003 | Kim et al. |
| 7,367,792 | B2 | * | 5/2008 | Remili et al. .............. 425/382 R |
| 2004/0115298 | A1 | * | 6/2004 | Hehenberger et al. ......... 425/311 |
| 2006/0068052 | A1 | * | 3/2006 | Remili et al. .................. 425/308 |

FOREIGN PATENT DOCUMENTS

| DE | 2 345 310 | | 3/1974 |
| EP | 1 593 474 | | 11/2005 |
| FR | 1 510 391 | A | 1/1968 |

* cited by examiner

*Primary Examiner* — Seyed Masoud Malekzadeh
(74) *Attorney, Agent, or Firm* — Collard & Roe, P.C.

(57) ABSTRACT

An apparatus for granulating plastic is described, comprising a granulating head (1) with nozzle bodies (2) which are inserted in the granulating head (1) and protrude axially beyond its face, and a perforated plate (5) placed axially in front of the granulating head (1), the pass-through holes (6) of which receive the protruding nozzle bodies (2) by interposing a ring seal (10) with play. In order to provide advantageous cutting conditions it is proposed that the nozzle bodies (2) are flush with the perforated plate (5), and that the ring seals (10) are held in a pretensioned manner in the radial direction between the walls of the pass-through holes (6) and the nozzle bodies (2).

6 Claims, 3 Drawing Sheets

APPARATUS FOR GRANULATING PLASTIC

CROSS REFERENCE TO RELATED APPLICATIONS

Applicant claims priority under 35 U.S.C. §119 of Austrian Application No. A 1029/2010 filed on Jun. 22, 2010, the disclosure of which is incorporated by reference.

The invention relates to an apparatus for granulating plastic, comprising a granulating head with nozzle bodies which are inserted in the granulating head and protrude axially beyond its face, and a perforated plate placed axially in front of the granulating head, the pass-through holes of which receive the protruding nozzle bodies by interposing a ring seal with play.

The strands of a molten polymer which exit from the nozzle bodies of the granulating head through the holes of the perforated plate in front of the granulating body are cut into pieces by means of a rotating knife head in apparatuses for granulating plastic. In order to avoid clumping of the cut pieces, rapid cooling needs to be ensured for the polymer strands which exit into a water bath, which leads to difficulties in the outlet area of the polymer strands because solidification of the melt in the orifice region must be prevented under all circumstances. It has already been proposed (EP 1 593 474 A1) for this purpose to arrange the pass-through openings in the perforated plate in a stepped manner and to provide the nozzle bodies protruding beyond the face surface of the granulating head with a thin-walled orifice projection which is offset from the face side of the nozzle body, which projection engages with play in the expanded pass-through holes and is sealed in relation to the perforated plate by an elastic ring seal which is clamped axially between the face side of the nozzle body and the hole shoulder which is obtained by the stepped arrangement of the hole. Such a ring seal is used to prevent the penetration of water and melt in the annular gap caused by the play between the protruding nozzle body and the expansion of the hole, thus preventing the cooling of the protruding nozzle body. As a result of the thin-walled orifice projection of the nozzle bodies which is set back relative to the perforated plate, the perforated plate forms the counter-blades for the blades of the knife head with the edges of the holes, which in the case of polymers with a comparatively fluid melt can lead to the consequence that the pieces cut from the polymer strands will flow apart and form an unshapely expansion in comparison with the cross section of the strand.

The invention is therefore based on the object of arranging an apparatus for granulating plastic in such a way that an unshapely expansion of the severed granulate parts is prevented without having to take any solidification of the melt in the orifice region of the nozzle bodies into account.

On the basis of an apparatus of the kind mentioned above for granulating plastic, this object is achieved by the invention in such a way that the nozzle bodies are flush with the perforated plate and that the ring seals are held in a pretensioned manner in the radial direction between the walls of the pass-through holes and the nozzle bodies.

As a result of the flush configuration of the nozzle bodies with the perforated plate it is ensured that it is not the perforated plate with the edges of the holes but the nozzle bodies themselves which cooperate with the blades of the knife head, so that the polymer strands are cut directly in the region of the face surface of the nozzle bodies. Advantageous cutting and cooling conditions are thereby ensured without having to take into account any disadvantageous temperature progression in the outlet region of the nozzle body. As a result of the play with which the nozzle bodies engage in the pass-through holes of the perforated plate, sufficient thermal insulation is achieved between the perforated plate and the nozzle bodies in order to prevent cooling of the nozzle body in the orifice region and to prevent likelihood of solidification of the melt in the orifice region of the nozzle bodies. Since the ring seal is held in a pretensioned manner in the radial direction between the wall of the pass-through holes and the nozzle bodies, no water and no melt can penetrate the annular gap between the nozzle bodies and the pass-through holes of the perforated plate. As a result of its radial clamping in comparison with axial clamping, the seal is protected because the different expansion behavior of the nozzle bodies and the perforated plate in the axial direction has a far stronger effect and relative axial displacements between the perforated plate and the nozzle bodies have no influence on the sealing effect of the ring seal in case of a predetermined radial pretensioning of the ring seal.

In order to substantially avoid additional loads on the nozzle bodies as a result of their use as counter-blades for the blades of the knife head, the face side of the nozzle bodies which is in alignment with the perforated plate can be provided with a bevel in the region of its outside circumference. This bevel extending along the outside circumference of the face side of the nozzle bodies represents a run-up surface for the blades of the knife head, which is usually pressed with a predetermined pressure against the perforated plate. This run-up surface prevents impact loads on the nozzle bodies that may occur otherwise, so that this measure not only improves the cutting conditions also extends the service life of the nozzle bodies and the blades.

In order to axially fix the ring seals, the ring seals are inserted in a circumferential groove which can be provided in the region of the walls of the pass-through holes, but also in the region of the nozzle bodies. Generally more advantageous constructional conditions are achieved however with an arrangement of an annular groove for accommodating the ring seal in the region of the nozzle bodies.

In order to impede access of water to the annular seals, the pass-through holes in the perforated plate can be provided with a conical tapering on the side facing away from the granulating head, in which the nozzle bodies engage with an also conically tapering end section. As a result of this measure, the cross-section of the annular gap between the nozzle bodies and the wall of the pass-through holes is drastically reduced in the region of the area of the perforated plate which faces the knife head without having to make do without a sufficient ring gap width necessary for thermal insulation adjacent to the conical section in the region of the ring seal. If the taper of the pass-through holes is larger than that of the nozzle bodies, a relative axial displacement between the perforated plate and the nozzle bodies as a result of different thermal expansions can easily be taken into account.

If the end of the nozzle body which is flush with the perforated plate is made from a ceramic material, especially advantageous conditions concerning the thermal behavior are obtained in the region of the perforated plate because the ceramic end of the nozzle body provides additional thermal insulation which counteracts the freezing of the plastic melt in the region of the outlet end of the nozzle body.

The subject matter of the invention is shown by way of example in the drawings, wherein.

Figure 1:
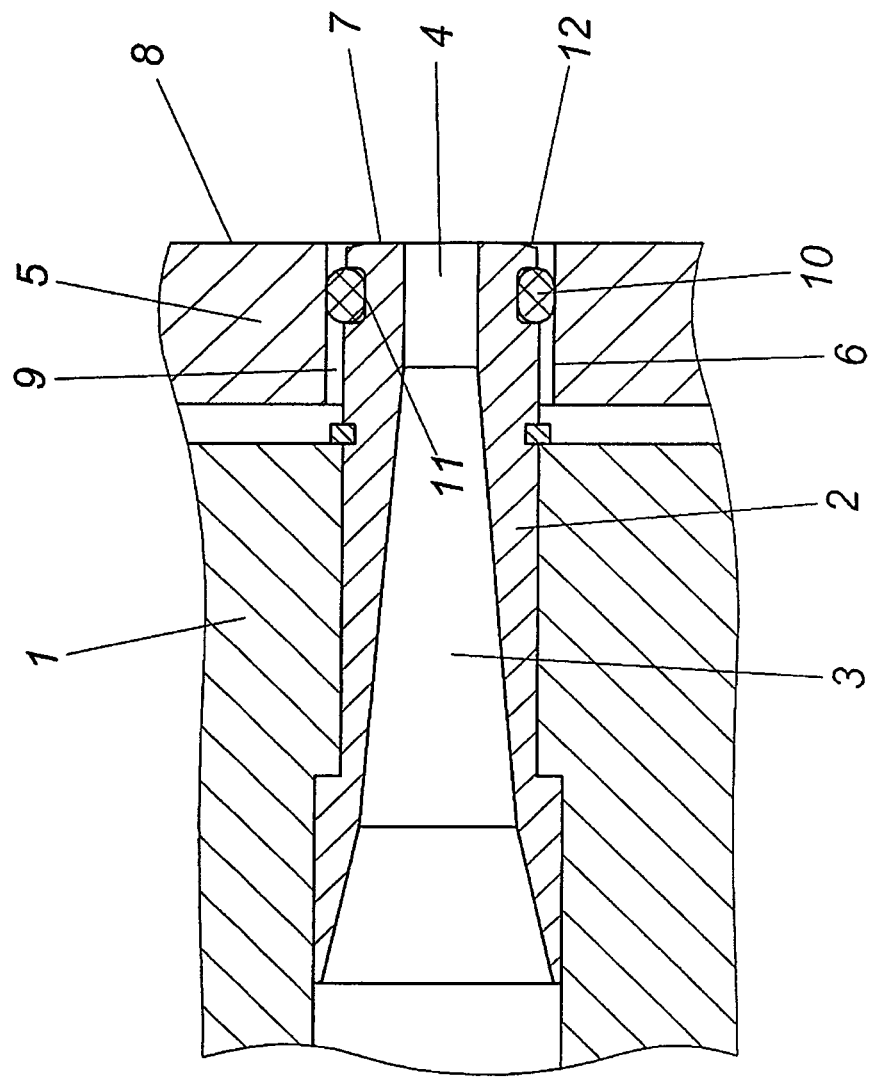
FIG. 1 shows an apparatus for granulating plastic in accordance with the invention in sections in the region of a nozzle body in a simplified longitudinal sectional view.

In accordance with FIG. 1, the illustrated apparatus for granulating plastic comprises a granulating head 1 with nozzle bodies 2 which are inserted in the granulating head 1 and protrude beyond its face surface. The nozzle bodies 2, of which only one is shown, are arranged at least along a divided circle and are penetrated by a flow conduit 3 which expires in a nozzle opening 4. A perforated plate 5 is placed in front of the granulating head 1 at a distance which causes thermal insulation, in the pass-through holes 6 of which the nozzle bodies 2 engage with play. The arrangement is made in such a way that the nozzle bodies 2 are flush with the perforated plate 5, i.e. the face side 7 of the nozzle bodies 2 is in alignment with a surface 8 of the perforated plate 5 facing the knife head which is not shown for reasons of clarity of the illustration. An elastic ring seal 10 is provided in the annular gap 9 between the nozzle bodies 2 and the wall of pass-through holes 6, which ring seal is held in a radially pretensioned manner between the respective nozzle body 2 and the wall of the pass-through hole 6 in order to prevent penetration of water or melt into the annular gap 9. The ring seal 10 is held in an annular groove 11 which is advantageously formed in the nozzle body 2. Any occurring axial displacements of the nozzle body 2 relative to the wall of the pass-through holes 6 can be taken into account in a simple way by means of such a ring seal 10 pretensioned between the wall of the pass-through holes 6 and the nozzle bodies 2 because such relative displacements do not cause any loads on the ring seal 10 in the pretensioning direction.

During the operation of such a granulating apparatus, the molten polymer strand passes through the flow conduit 3 and through the nozzle opening 4 into the water bath provided in the granulating chamber and is cut into pieces of equal length by the blades of the knife head axially pressed against the perforated plate 5, with the nozzle body 2 being effective itself as a counter-blade for the blades of the knife head. In order to keep the load on the nozzle bodies 2 at a low level in the region of the face side cooperating with the blades of the knife head, the face side 7 of the nozzle bodies 2 which is in alignment with the perforated plate 5 is provided with a bevel 12 in the region of its outside circumference, so that the blades of the knife head can optionally slide up the bevel 12 as a run-up surface onto the face side of the nozzle body 2.

Figure 2:
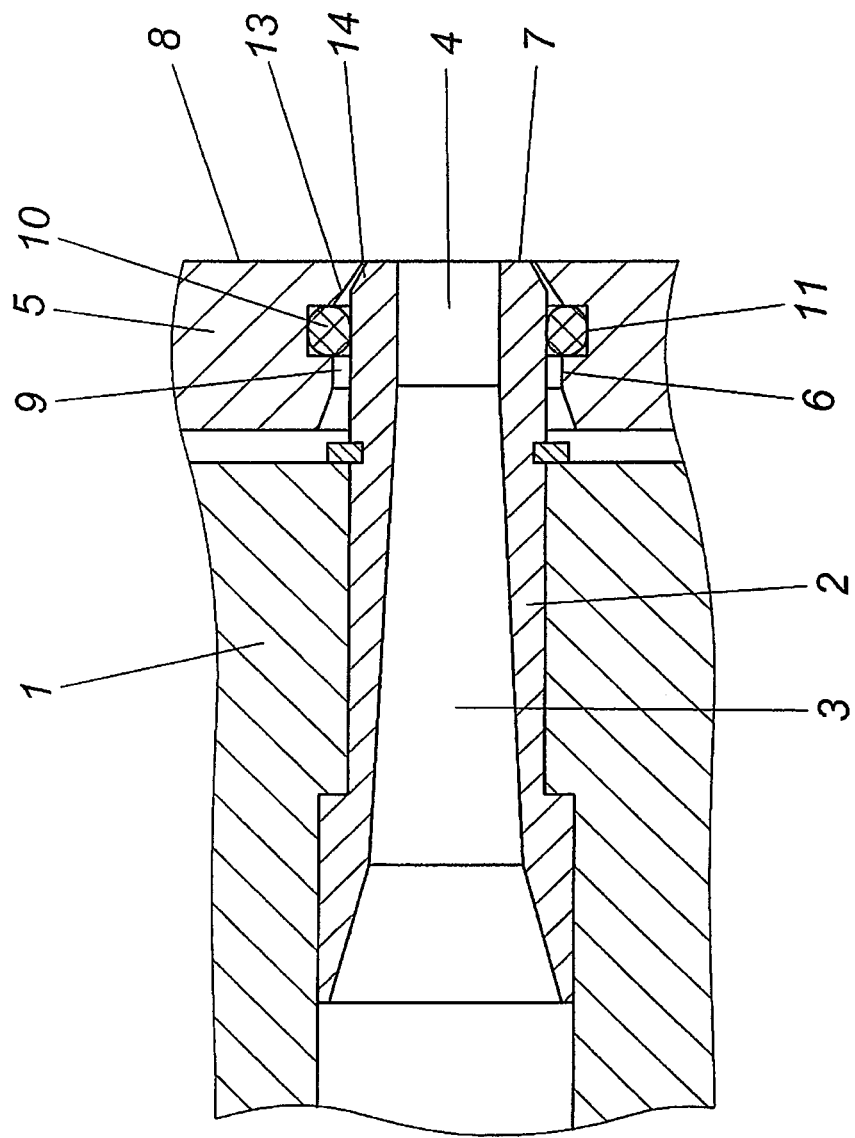
FIG. 2 shows an embodiment in an illustration corresponding to FIG. 1.

The embodiment of a granulating apparatus in accordance with the invention according to FIG. 2 differs from the embodiment as shown in FIG. 1 substantially by the arrangement of the annular gap 9 between the wall of the pass-through holes 6 and the nozzle bodies 2 in the region of the surface 8 of the perforated plate 5 facing the knife head. The pass-through holes 6 conically taper on the side facing away from the granulating head 1. The tapering is designated in FIG. 2 with reference numeral 13. Similarly, the nozzle body 2 is also provided with a conically tapering end section 14 which engages in the inside cone of the taper 13 of the pass-through holes 6. Since the conicity of the taper 13 of the pass-through holes 6 is larger than that of the conical end section 14 of the nozzle body 2, axial relative movements between the nozzle body 2 and the perforated plate 5 can be taken into account advantageously. As is shown directly in FIG. 2, the annular gap 9 between the ring seal 10 and the surface 8 of the perforated plate 5 is reduced drastically by the conical taper 13 of the pass-through holes 6 of the perforated plate 5 and by the tapering end section 14 of the nozzle bodies 2. A heat transfer via a larger water volume between the perforated plate 5 and the nozzle bodies 2 can be prevented to a substantial extent, with an annular gap 9 which is sufficiently wide for good thermal insulation remaining outside of the water region adjacent to the ring seal 10 on the side facing away from the taper 13. In contrast to FIG. 1, the annular groove 11 for receiving the ring seal 10 is associated with the perforated plate 5.

Figure 3:
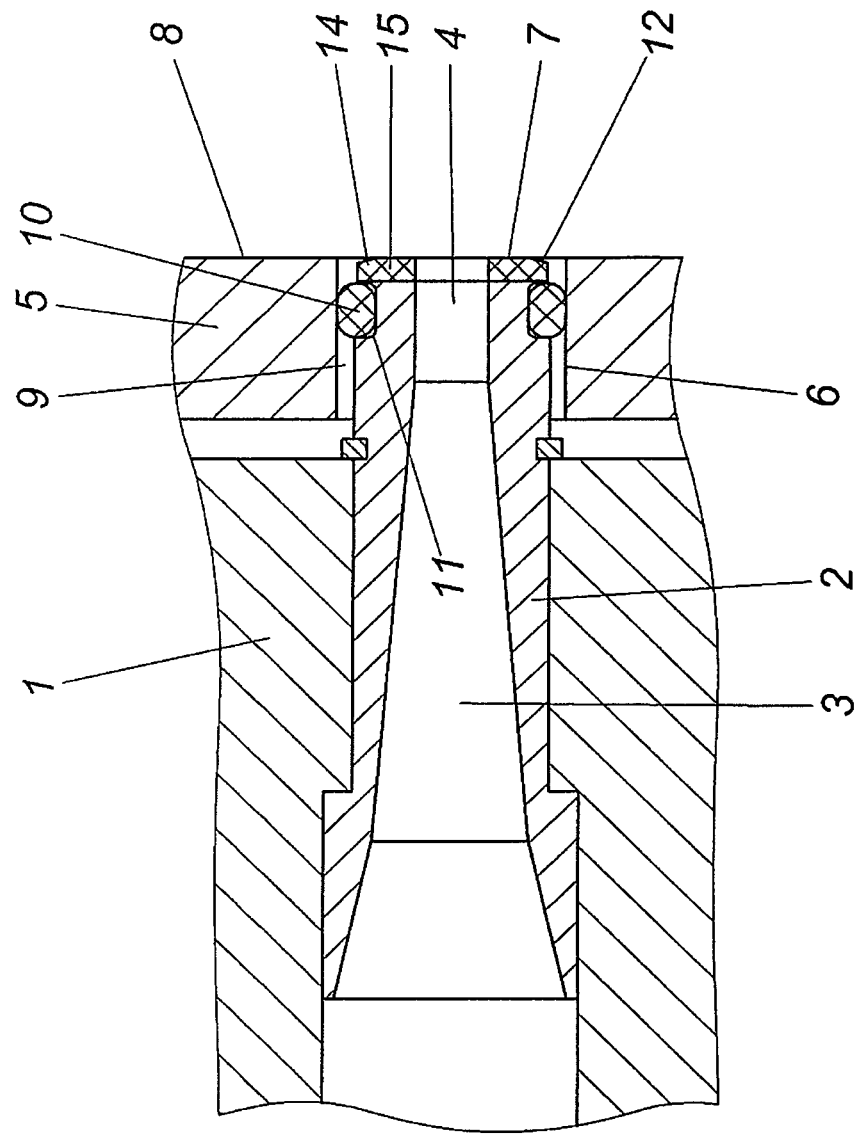
FIG. 3 shows a further embodiment of an apparatus in accordance with the invention in a simplified longitudinal sectional view.

In accordance with FIG. 3, the nozzle body 2 comprises an end 15 which forms the face surface 7 and is made from a ceramic material, so that the portion of the nozzle body 2 which protrudes beyond the ring seal 10 and comes into contact with the water bath forms a thermal insulation which counteracts cooling of the nozzle body 2 in the region of the water. As a result of this measure, the width of the annular gap 9 between the wall of the pass-through holes 6 and the nozzle bodies 2 can be chosen to be larger, which has an advantageous effect on the production tolerances.

The invention claimed is:

1. An apparatus for granulating plastic, comprising a granulating head with a granulating head face and nozzle bodies which have cylindrical outer walls and are inserted in the granulating head and protrude axially beyond the granulating head face, and a perforated plate placed axially in front of the granulating head, the perforated plate comprising pass-through holes having cylindrical walls, said pass-through holes receiving the nozzle bodies protruding beyond the granulating head face by interposing a ring seal with play, wherein the nozzle bodies are flush with the perforated plate so that face ends of the nozzle bodies are aligned with a first surface of the perforated plate configured to provide a sufficient thermal insulation between the perforated plate and the nozzle bodies in order to prevent cooling of the respective nozzle body in an orifice region and to avoid solidification of a melt in the orifice region of the nozzle bodies, the first surface of the perforated plate facing away from the granulating head face, and wherein each of the ring seals is held in a pretensioned manner in a radial direction in a cylindrical annular gap between the respective cylindrical wall of the respective pass-through hole and the respective cylindrical outer wall of the respective nozzle body that projects into the respective pass-through hole.

2. The apparatus according to claim 1, wherein the face ends comprise a bevel in a region of an outside circumference of the face ends.

3. The apparatus according to claim 1, wherein the nozzle bodies comprise an annular groove for accommodating the ring seal in a region of the pass-through holes.

4. The apparatus according to claim 1, wherein the pass-through holes in the perforated plate are provided with a conical taper on a side facing away from the granulating head, and wherein the nozzle bodies engage with an also conically tapering end section in the conical taper of the pass-through holes.

5. The apparatus according to claim 4, wherein the pass-through holes have a conicity larger than that of the nozzle bodies.

6. The apparatus according to claim 1, wherein ends of said nozzle bodies are made of a ceramic material.

* * * * *